May 20, 1930.   C. DEROSSI   1,759,735
AUTOMATIC APPARATUS FOR PREPARING AERATED WATER
Filed April 6, 1929
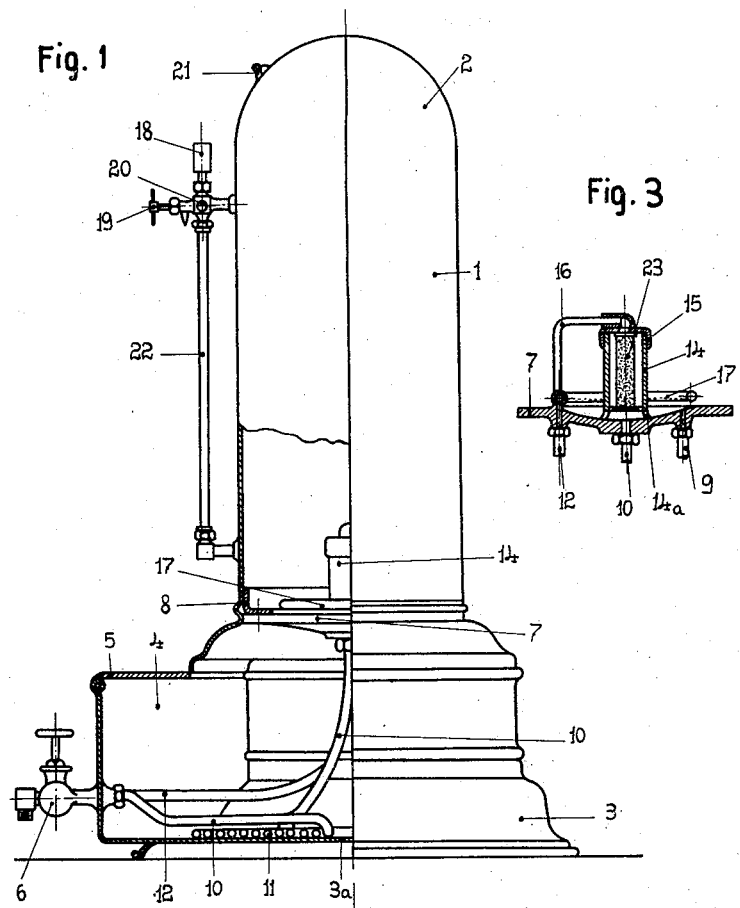
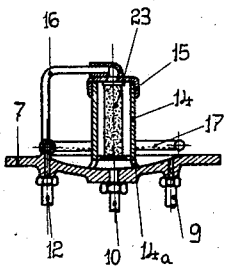
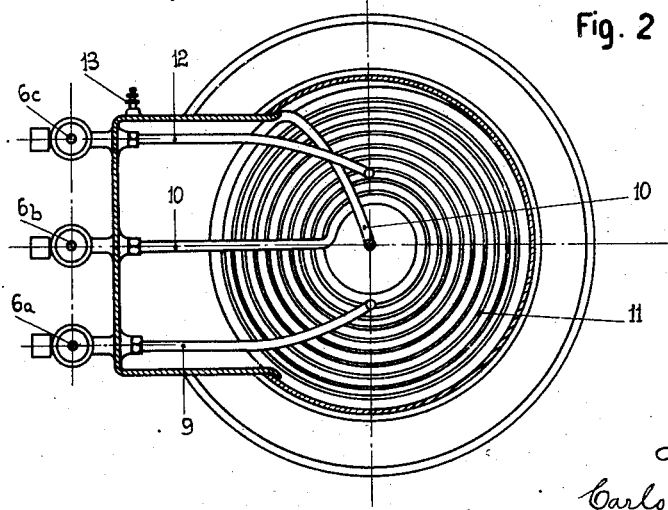
Inventor,
Carlo Derossi,
By [signature]
atty Patented May 20, 1930

1,759,735

UNITED STATES PATENT OFFICE

CARLO DEROSSI, OF TURIN, ITALY

AUTOMATIC APPARATUS FOR PREPARING AERATED WATER

Application filed April 6, 1929, Serial No. 353,011, and in Italy November 26, 1928.

This invention refers to an automatic apparatus for preparing aerated water and is an improvement on my application Serial No. 233,139 filed November 14, 1927.

The chief object of this invention is to provide a device for refrigerating the aerated water as it is being drawn. This device comprises a vessel forming the base of the apparatus and containing ice or another refrigerating medium and a coil immersed in said refrigerating medium and through which the aerated water issuing from the aerator is conveyed.

A further object of this invention is to provide an aerating unit centrally fixed on the bottom of the tank for the water to be aerated and adapted to receive the partly aerated water at its lower portion and the gas through a perforated tube and arranged coaxially inside the aerator, so that the aeration is completed during the extraction of the aerated water.

The accompanying drawing shows, by way of example, an apparatus according to this invention.

Figure 1 shows the complete apparatus, partly in side view, partly in vertical section.

Figure 2 is a plan view on which the section is taken directly above the refrigerating coil.

Figure 3 shows the aerating unit in vertical section.

The apparatus comprises a tank 1 consisting of a cylindrical body and a semi-spherical top 2. To the tank 1 is fitted below a base 3 conveniently shaped for appearance's sake carrying a casing 4 with a hinged lid 5. Cocks 6 for the production of the aerated water project from the wall of the casing 4. The aerating unit is carried by a disc 7, screwed to the flange 8 welded to the lower end of the tank 1. The aerating unit is lodged inside the tank 1 and completely surrounded by water which is introduced through an inlet on the disc 7 by means of a tube 9 controlled by the cock $6^a$ (Figure 3). The aerated water is drawn centrally from the aerator through a tube 10.

The tube 10 is wound to form a coil 11 on the bottom $3^a$ of the base 3, and is controlled by the cock $6^b$. Carbonic acid gas is admitted into the aerator through another inlet opening on the disc 7 from a tube 12 controlled by the cock $6^c$. The base 3 is filled with ice in lumps by opening the lid 5 of the casing 4 and the molten water is withdrawn through tube connected in 13 to the bottom $3^a$; as the aerated water is drawn by opening the cock $6^b$ or the cock of a tube connected therewith, it flows through the coil 11 where it is efficiently cooled, after the previous cooling undergone in the tank 1 lying above the ice. It is clear that the ice vessel may have double walls lined with a suitable heat insulating material.

The aerator comprises a tubular vessel 14 fixed to the centre of the disc 7 (Figure 3), closed above by a cap 15 and provided below with holes $14^a$ through which the water contained in the tank 1—2 may be admitted into the vessel 14. The gas flows into this latter through a concentrical tube 23 carried by the cap 15 and centered by means of a diaphragm which is perforated on its lower edge and provided with a large number of capillary holes. The tube 23 is connected by the crank 16 to the carbonic acid tube 12. To the tube 12 is connected, in proximity to the disc, 7, the tubular ring 17, through the holes of which part of the gas bubbles into the water contained in the tank 1—2 and aerates said water, the remaining gas flowing into the aerator tube 16. When the cock $6^b$ is opened the aerated water is caused to flow into the tube 10 through the central hole on the disc 7 under the action of the pressure existing in the tank 1—2; said water passing through the aerator holes $14^a$ where it receives a further supply of carbonic acid gas delivered by the tube 16. The gas will dissolve into the water as this flows through the coil 11 before reaching the cock $6^b$.

The cylindrical body 1 carries a water level 22, to the upper end of which is attached a pressure gauge 18, a needle cock 19 and a safety valve 20.

A plug 21 is fitted on the top 12 for filling in water when a pressure water main is not available.

What I claim is:

1. An automatic apparatus for the rapid production of aerated water comprising in combination a vessel for the water to be aerated, an aerating unit located in said vessel and centrally fixed to the bottom of this latter, means for admitting gas into said aerating unit and said vessel, a hollow base for said vessel adapted to contain a refrigerating medium, a coil in said hollow base and connected at one end to said aerating unit and an outlet cock at the other end of said coil.

2. An automatic apparatus for the rapid production of aerated water comprising, in combination, a vessel for the water to be aerated, an aerating unit located in said vessel and centrally fixed to the bottom of this latter, said aerating unit comprising a tubular vessel closed above and communicating below through holes with the water vessel and a perforated coaxial tube fixed inside said tubular vessel, a second perforated tube in proximity to the bottom of the water vessel for admitting gas directly into the water contained in the vessel, a branch pipe connecting said second tube with the perforated tube of the aerating unit, a hollow base for said vessel adapted to contain a refrigerating medium, a coil in said hollow base and connected at one end with the lower portion of said tubular vessel and an outlet cock at the other end of said coil.

In testimony that I claim the foregoing as my invention, I have signed my name.

CARLO DEROSSI.